(12) United States Patent
Fujimura et al.

(10) Patent No.: US 7,291,255 B2
(45) Date of Patent: Nov. 6, 2007

(54) METHOD AND APPARATUS FOR PRODUCING HIGH-PURITY HYDROGEN

(75) Inventors: Hiroyuki Fujimura, Tokyo (JP); Chi Matsumura, Fujisawa (JP); Takahiro Oshita, Tokyo (JP); Kanichi Ito, Tokyo (JP)

(73) Assignee: Ebara Corporation, Tokyo (JP)

( * ) Notice: Subject to any disclaimer, the term of this patent is extended or adjusted under 35 U.S.C. 154(b) by 282 days.

(21) Appl. No.: 10/623,159

(22) Filed: Jul. 21, 2003

(65) Prior Publication Data

US 2004/0124095 A1    Jul. 1, 2004

(30) Foreign Application Priority Data

Jul. 25, 2002    (JP)    ............... 2002-249754

(51) Int. Cl.
  *C25B 1/02*    (2006.01)
(52) U.S. Cl. .................................... 205/637
(58) Field of Classification Search .............. None
    See application file for complete search history.

(56) References Cited

U.S. PATENT DOCUMENTS

| 4,229,184 | A | * | 10/1980 | Gregg | ................ | 48/62 R |
| 4,312,740 | A | * | 1/1982 | Chiaramonte | ............... | 208/410 |
| 4,953,479 | A | * | 9/1990 | Keller et al. | ................ | 110/233 |
| 6,051,125 | A | | 4/2000 | Pham et al. | | |
| 6,736,955 | B2 | * | 5/2004 | Shaw | ................ | 205/450 |

FOREIGN PATENT DOCUMENTS

| JP | 51-119703 | 10/1976 |
| JP | 51-142872 | 12/1976 |
| JP | 51-142873 | 12/1976 |

OTHER PUBLICATIONS

Derwent abstract of JP 51-119703 A.*
Translation of JP 51-119703 A.*

* cited by examiner

*Primary Examiner*—Harry D Wilkins, III
(74) *Attorney, Agent, or Firm*—Wenderoth, Lind & Ponack, L.L.P.

(57) ABSTRACT

High-purity hydrogen is recovered from a pyrolysis gas, composed mainly of hydrogen and carbon monoxide, produced by pyrolysis of an organic material such as biomass. A method for producing such high-purity hydrogen includes supplying a reducing gas produced by pyrolysis of an organic material to an anode side of a high-temperature steam electrolyzer having a diaphragm comprising solid oxide electrolyte; and supplying steam to a cathode side of the high-temperature steam electrolyzer to produce hydrogen and oxygen by electrolytic action. The oxygen produced in the cathode side of the high-temperature electrolyzer passes through the diaphragm and reacts with the reducing gas to create concentration gradient of oxygen ion, thus lowering electrolysis voltage.

4 Claims, 3 Drawing Sheets

Pyrolysis gas or Methane $H_2$ ($H_2O$)

$H_2O$

Gas analyzed

Graph 1

Graph 2
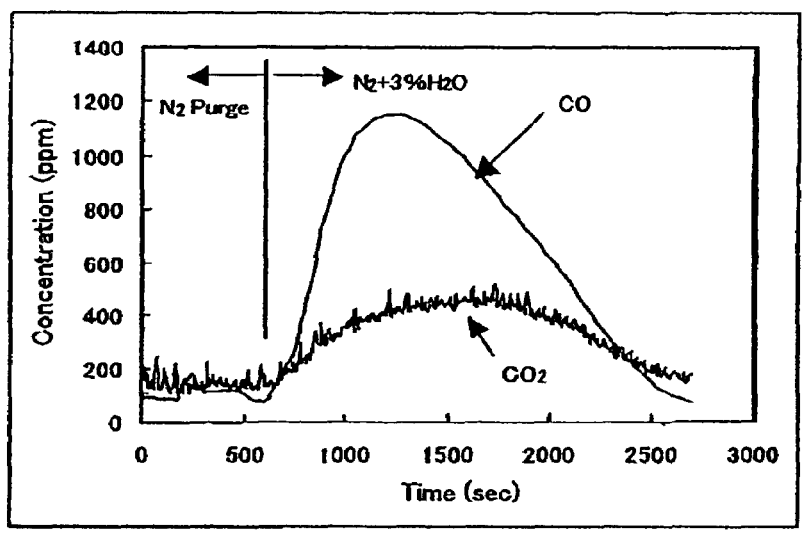
Graph 3
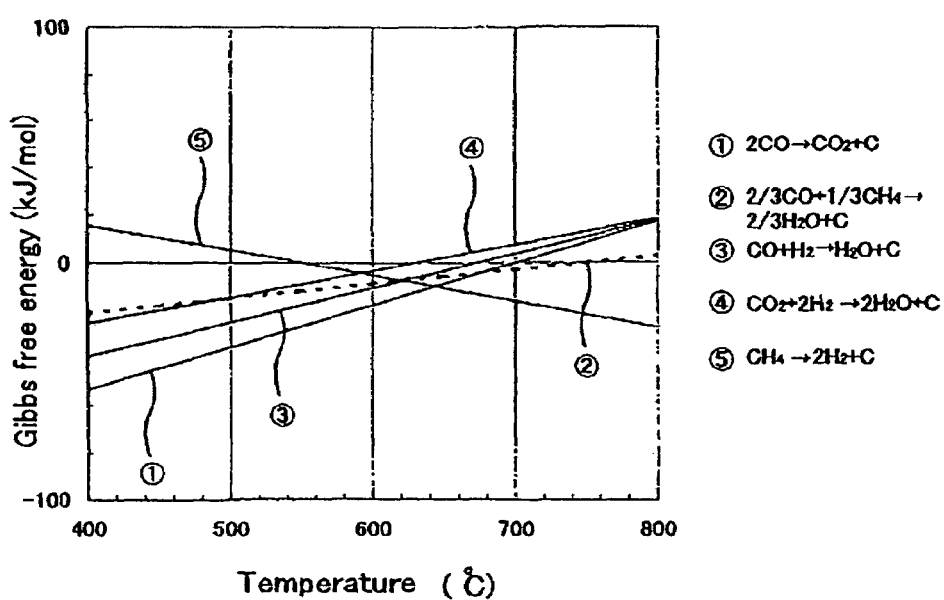

Graph 4
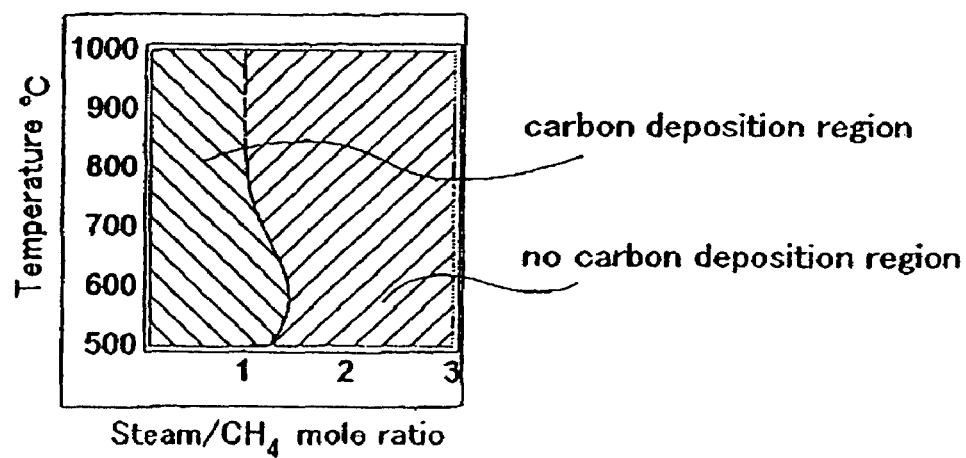

METHOD AND APPARATUS FOR PRODUCING HIGH-PURITY HYDROGEN

BACKGROUND OF THE INVENTION

1. Field of the Invention

The present invention relates to a method and apparatus for producing high-purity hydrogen, and more particularly to a method and apparatus for recovering high-purity hydrogen from a pyrolysis gas, composed mainly of hydrogen and carbon monoxide, produced by pyrolysis of an organic material, for example, biomass such as waste wood or raw refuse.

2. Description of the Related Art

A pyrolysis gas, composed mainly of hydrogen and carbon monoxide, produced by pyrolysis of biomass such as waste wood or raw refuse is hydrogenated by steam reforming, and then hydrogen is separated and purified, and the purified hydrogen is effectively utilized as a fuel for a fuel cell. However, in a polymer electrolyte fuel cell which is expected as a technology close to utilization in recent years, because platinum is employed as a catalyst, it is necessary to make carbon monoxide contained in hydrogen almost zero. Therefore, gas reforming and purification for producing high-purity hydrogen is troublesome, and causes problems of operativity and economical efficiency.

In an electrolytic process which utilizes electric power generated by a pyrolysis gas, high-purity hydrogen can be produced by a relatively simple structure. However, this electrolytic process consumes a large amount of electric power.

On the other hand, there is a method of electrolyzing high-temperature steam at a high-temperature of 800° C. or higher. In this method, thermal energy is used to electrolyze water, thereby lowering electrolysis voltage to reduce the electrolysis power. However, this method needs to supplement 60% or more of electrolysis energy of water with electric power. As an improvement of the method of electrolyzing high-temperature steam, there has been proposed a method for lowering electrolysis voltage required for moving oxygen to an anode side of an electrolyzer by supplying natural gas to an anode of the electrolyzer in U.S. Pat. No. 6,051,125. This method is problematic in that expensive natural gas is consumed and it is necessary to take measures for preventing electrodes from being contaminated with carbon deposited by reaction of natural gas with oxygen. Therefore, the method proposed in U.S. Pat. No. 6,051,125 poses a problem in practical use.

SUMMARY OF THE INVENTION

The present invention has been made in view of the above drawbacks. It is therefore an object of the present invention to provide a method and apparatus for recovering high-purity hydrogen economically from a pyrolysis gas produced from an organic material such as biomass in a relatively simple structure and a reduced operational difficulty while reducing consumption of expensive utility such as electric power or town area gas.

In order to achieve the above object, according to the present invention, attention is given to the following ① to ④.

① pyrolysis gas of biomass such as waste wood or raw refuse is a reducing gas composed mainly of hydrogen and carbon monoxide.

② An electrolysis voltage is greatly lowered by supplying the reducing gas of ① to an anode side of a high-temperature steam electrolyzer and allowing the reducing gas to react with oxygen ions at the anode side of the high-temperature steam electrolyzer.

③ There is no fear of contaminating an electrode because carbon is not deposited in oxidation-reaction of the reducing gas of ① composed mainly of hydrogen and carbon monoxide.

④ Because a pyrolysis furnace comprises a dual fluidized bed pyrolysis process, the pyrolysis gas is not mixed with combustion gas to increase a concentration of the reducing gas, thus allowing the electrolyzer and the associated devices to be compact and reducing heat loss.

Specifically, the present invention utilizes the synergistic effect of a pyrolysis furnace and a high-temperature steam electrolyzer.

According to a first aspect of the present invention, there is provided a method for producing high-purity hydrogen, comprising: supplying a reducing gas produced by pyrolysis of an organic material to an anode side of an electrolyzer having a diaphragm comprising solid oxide electrolyte; and supplying steam to a cathode side of the electrolyzer to produce hydrogen and oxygen by electrolytic action; wherein the oxygen produced in the cathode side of the electrolyzer passes through the diaphragm and reacts with the reducing gas to create concentration gradient of oxygen ions, thus lowering electrolysis voltage.

In a preferred aspect of the present invention, the electrolyzer comprises a high-temperature electrolyzer.

In a preferred aspect of the present invention, the organic material comprises biomass.

In a preferred aspect of the present invention, the biomass comprises waste wood or raw refuse.

According to a second aspect of the present invention, there is provided an apparatus for producing high-purity hydrogen, comprising: a pyrolysis furnace for pyrolyzing an organic material; an electrolyzer having a diaphragm comprising solid oxide electrolyte; a line for supplying a pyrolysis gas produced in the pyrolysis furnace to an anode side of the electrolyzer; and a line for supplying steam to a cathode side of the electrolyzer.

In a preferred aspect of the present invention, the electrolyzer comprises a high-temperature electrolyzer.

In a preferred aspect of the present invention, the organic material comprises biomass.

In a preferred aspect of the present invention, the biomass comprises waste wood or raw refuse.

In a preferred aspect of the present invention, the pyrolysis furnace comprises a dual fluidized bed pyrolysis process having a pyrolysis fluidized bed and a combustion fluidized bed, heating medium is circulated between the pyrolysis fluidized bed and the combustion fluidized bed, and a reducing gas is supplied to the electrolyzer while preventing the pyrolysis gas from being mixed with combustion gas.

In a preferred aspect of the present invention, the reducing gas comprises a high concentration reducing gas.

In a preferred aspect of the present invention, a flow control valve is provided in each of the line for supplying the pyrolysis gas produced in the pyrolysis furnace to the anode side of the electrolyzer and the line for supplying the steam to the cathode side of the electrolyzer.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

An apparatus for producing high-purity hydrogen according to an embodiment of the present invention will be described below with reference to FIG. 1.

Figure 1:
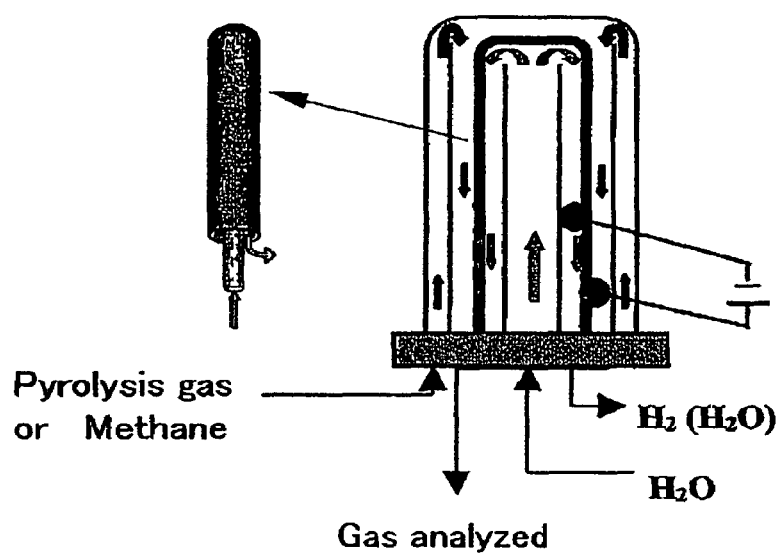
FIG. 1 is a block diagram showing an apparatus for producing high-purity hydrogen according to an embodiment of the present invention.
Figure 1:
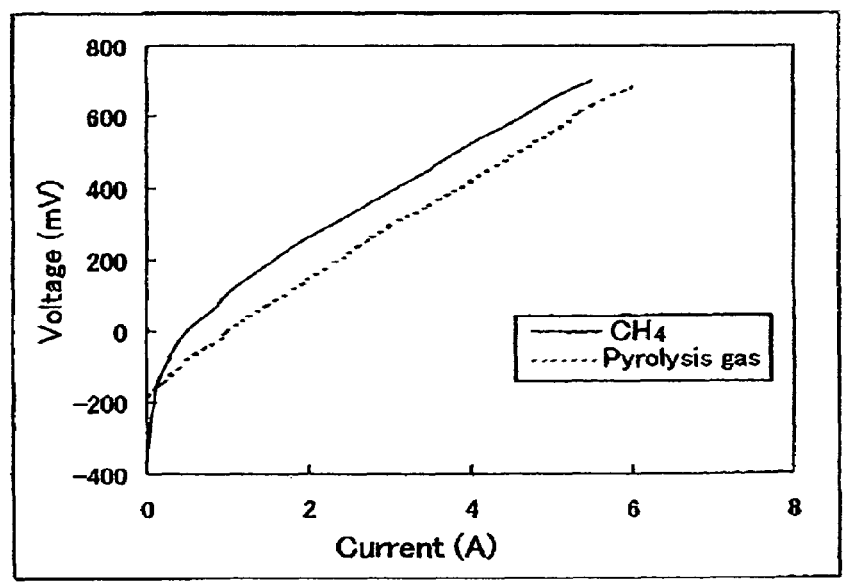

As shown FIG. 1, a pyrolysis furnace 1 comprises a pyrolysis fluidized bed 2 which employs steam 6 as a fluidizing gas, a combustion fluidized bed 3 which employs air 7 as a fluidizing gas, and a heating medium moving bed 4 for allowing a heating medium (sand) to move between the pyrolysis fluidized bed 2 and the combustion fluidized; bed 3. Raw material 5 comprising biomass such as waste wood or raw refuse as an organic material is supplied to the pyrolysis fluidized bed 2 and pyrolyzed by heat of the heating medium (sand) to produce a reducing pyrolysis gas 8 composed mainly of hydrogen and carbon monoxide, and char. The produced char moves together with the heating medium from the pyrolysis fluidized bed 2 to the combustion fluidized bed 3 through the heating medium moving bed 4, and is combusted in the combustion fluidized bed 3. The heating medium is heated by combustion of char in the combustion fluidized bed 3, and is then returned to the pyrolysis fluidized bed 2 through the heating medium moving bed 4. Waste heat of combustion exhaust gas 12 discharged from the combustion fluidized bed 3 may be utilized in a separate device or the like. As a fluidizing gas in the pyrolysis fluidized bed 2, a part of the pyrolysis gas 8 may be circulated and used, in place of the steam 6. The produced pyrolysis gas 8 is distributed through a flow control valve 9 to a line 10 and a line 11 in controlled distributed amount. The gas flowing through the line 10 is supplied to an anode side 15 of a high-temperature steam electrolyzer 13, and the gas flowing through the line 11 is stored in a gas reservoir (not shown) and utilized in a gas engine or the like.

The high-temperature steam electrolyzer 13 is partitioned into an anode side 15 and a cathode side 16 by a diaphragm 14 comprising solid oxide electrolyte. Alternating-current electric power 17 is converted into direct current electric power by an AC-DC converter 18, and the direct current electric power is supplied to the high-temperature steam electrolyzer 13, and hence high-temperature steam 19 supplied to the cathode side 16 is electrolyzed into hydrogen 20 and oxygen 21. Oxygen 21 passes through the diaphragm 14 comprising solid oxide electrolyte preferentially, and moves to the anode side 15 by potential driving force. Hydrogen 20 is recovered from the cathode side 16 of the high-temperature steam electrolyzer 13. Oxygen 21 reacts with the reducing pyrolysis gas 8 and is consumed in the anode side 15, and concentration gradient of oxygen ions is created to lower electrolysis voltage required for electrolysis of water, and hence power consumption is greatly reduced. High-temperature exhaust gas 22 generated in the anode side 15 passes through a heat exchanger 23, and is then discharged to the outside of the system as low-temperature exhaust gas 24. Steam 6 produced in the heat exchanger 23 can be utilized as the fluidizing gas of the pyrolysis fluidized bed 2, and high-temperature steam 19 is distributed through a flow control valve 26 to a line 27 and a line 28 in controlled distributed amount. The high-temperature steam 19 flowing through the line 27 is supplied to the cathode side 16, and the high-temperature steam flowing through a line 28 is utilized for electric, power generation or the like. In the drawing, the reference numeral 25 represents pure water.

When the high-temperature steam electrolyzer 13 is put to practical use, the following is required:
(a) The volume of the high-temperature steam electrolyzer 13 should be as small as possible.
(b) Because the temperature of the diaphragm 14 reaches a high-temperature of 800° C., heat loss should be reduced.
(c) Carbon which contaminates the electrodes should not be deposited in reaction of a reducing gas with oxygen.

With respect to these requirements, as described above, in the dual fluidized bed pyrolysis process, the pyrolysis gas 8 produced in the pyrolysis furnace 1 is not mixed with the combustion exhaust gas 12. For example, the pyrolysis gas 8 produced by pyrolysis of wood materials at a temperature of about 800° C. is composed of about 57% hydrogen, about 26% carbon monoxide and about 12% carbon dioxide, and thus becomes an extremely high concentration reducing gas. Therefore, the volume of the high-temperature steam electrolyzer 13 which receives the pyrolysis gas and the volume of the heat exchanger 23 become small, and hence heat loss caused by waste heat or heat radiation is reduced. Further, because the reducing gas is mainly composed of hydrogen and carbon monoxide, there is no fear of electrode contamination caused by carbon deposition due to reaction of reducing gas with oxygen.

As electric power 17 required for electrolysis, inexpensive night electric power, and electric power obtained by industry-owned power generation such as power generation by gas engine which utilizes excess pyrolysis gas supplied through the line 11 or power generation by steam turbine which utilizes excess high-temperature steam supplied through the line 28 can be used. The pyrolysis gas 8 and the high-temperature steam 19 supplied to the high-temperature steam electrolyzer 13 can be automatically controlled in amount by the respective flow control valves 9 and 26 so that the operational temperature (about 800° C.) of the high-temperature steam electrolyzer 13 can be maintained and the high-temperature steam electrolyzer 13 can be operated under optimum condition so as to meet input electric energy and the quantity of generated hydrogen.

According to the present invention, the following advantages can be offered.

High-purity hydrogen which can be utilized as a fuel of a polymer electrolyte fuel cell can be recovered economically from biomass having a low value on the basis of synergestic effect of the pyrolysis furnace and the high-temperature steam electrolyzer in a relatively simple structure and a reduced operational difficulty while reducing consumption of expensive utility such as electric power or town area gas.

Although a certain preferred embodiment of the present invention has been shown and described in detail, it should be understood that various changes and modifications may be made therein without departing from the scope of the appended claims.

What is claimed is:

1. A method for producing high-purity hydrogen, comprising:
   supplying a reducing gas, composed mainly of hydrogen and carbon monoxide, produced by pyrolysis of an organic material to an anode side of an electrolyzer having a diaphragm comprising solid oxide electrolyte;
   supplying steam to a cathode side of said electrolyzer to produce hydrogen and oxygen by electrolytic action,
   wherein said oxygen produced in said cathode side of said electrolyzer passes through said diaphragm and reacts with said reducing gas to create concentration gradient of oxygen ions, thus lowering electrolysis voltage;
   supplying a high temperature gas, which is generated in said anode side of said electrolyzer, to a heat exchanger; and supplying steam produced in said heat exchanger to a pyrolysis fluidized bed of a pyrolysis furnace that produces the reducing gas,
wherein the steam supplied to said cathode side of said electrolyzer is produced in said heat exchanger.

2. A method according to claim 1, wherein said electrolyzer comprises a high-temperature electrolyzer.

3. A method according to claim 1, wherein said organic material comprises biomass.

4. A method according to claim 3, wherein said biomass comprises waste wood or raw refuse.

* * * * *